United States Patent
Balasubramaniam et al.

(10) Patent No.: US 6,499,109 B1
(45) Date of Patent: Dec. 24, 2002

(54) METHOD AND APPARATUS FOR SECURING SOFTWARE DISTRIBUTED OVER A NETWORK

(75) Inventors: Chandrasekar Balasubramaniam, Sunnyvale, CA (US); Ravi Kannan, Sunnyvale, CA (US); Siddaraya Basappa Revashetti, Pune (IN); Srivats Sampath, San Jose, CA (US); Babu Katchapalayam, Santa Clara, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/248,115

(22) Filed: Feb. 11, 1999

Related U.S. Application Data

(63) Continuation-in-part of application No. 09/208,735, filed on Dec. 8, 1998, now Pat. No. 6,266,774.

(51) Int. Cl.⁷ ................................. G06F 11/30
(52) U.S. Cl. ................... 713/201; 709/223; 705/59; 713/176
(58) Field of Search ................. 713/200, 201, 713/156, 176, 155, 168, 169, 170, 175; 709/217–219, 223–229, 310, 311; 705/59, 51, 53, 54, 76; 340/5.85, 5.86

(56) References Cited

U.S. PATENT DOCUMENTS

| | | | | | |
|---|---|---|---|---|---|
| 5,715,403 A | * | 2/1998 | Stefik | ........................ | 705/44 |
| 5,841,978 A | * | 11/1998 | Rhoads | ........................ | 709/217 |
| 5,958,051 A | * | 9/1999 | Renaud et al. | ........................ | 713/200 |
| 5,960,170 A | | 9/1999 | Chen et al. | ........................ | 395/183.14 |
| 6,065,120 A | * | 5/2000 | Laursen et al. | ........................ | 713/201 |
| 6,092,194 A | * | 7/2000 | Touboul | ........................ | 713/200 |
| 6,092,204 A | * | 7/2000 | Baker | ........................ | 713/201 |
| 6,138,237 A | * | 10/2000 | Ruben et al. | ........................ | 713/200 |
| 6,154,844 A | * | 11/2000 | Touboul et al. | ........................ | 713/201 |
| 6,173,406 B1 | * | 1/2001 | Wang et al. | ........................ | 713/201 |
| 6,202,158 B1 | * | 3/2001 | Urano et al. | ........................ | 713/201 |
| 6,219,790 B1 | * | 4/2001 | Lloyd et al. | ........................ | 713/201 |
| 6,266,774 B1 | * | 7/2001 | Sampath et al. | ........................ | 713/201 |
| 6,272,631 B1 | * | 8/2001 | Thomlinson et al. | ........................ | 713/155 |
| 6,286,001 B1 | * | 9/2001 | Walker et al. | ........................ | 707/9 |
| 6,321,334 B1 | * | 11/2001 | Jerger et al. | ........................ | 713/200 |
| 6,345,361 B1 | * | 2/2002 | Jerger et al. | ........................ | 713/200 |
| 6,434,607 B1 | * | 8/2002 | Haverstock et al. | ........................ | 709/217 |
| 2002/0124170 A1 | * | 5/2002 | Jonhson, Jr. | ........................ | 713/176 |
| 2002/0078345 A1 | * | 6/2002 | Sandhu et al. | ........................ | 713/155 |
| 2002/0087660 A1 | * | 7/2002 | Martin et al. | ........................ | 709/218 |

FOREIGN PATENT DOCUMENTS

JP   2000029883 A   *   1/2000   ........... G06F/17/30

OTHER PUBLICATIONS

Guiri et al, "Role–Based Access Control in Java," May 1998, 3rd ACM Workshop on Role–Based Access, p. 91–101.*

Kemmerer, Richard "Security Issues in Distributed Software," Nov. 1997, Reliable Software Group, Department of Computer Science Univerisity of California, Santa Barbara, p. 52–59.*

"Addamax's UNIX Moves" Nov. 1991, Computer Reseller News, p. 54.*

(List continued on next page.)

*Primary Examiner*—Gail Hayes
*Assistant Examiner*—Christopher Revak
(74) *Attorney, Agent, or Firm*—Silicon Valley IP Group, LLC.; Kevin J. Zilka; Christopher J. Hamaty

(57) ABSTRACT

A method and computer executable program code are disclosed to verify the source of software downloaded from a remote site to a client computer over a computer network before the software can be executed on the client computer.

8 Claims, 3 Drawing Sheets

OTHER PUBLICATIONS

"Lavasoft Ad-aware" Oct. 2001, www.tomcoyote.com/Is-manual.html.*

Brown "Special Edition Using Netscape 2" 1996, Que Communication, $2^{nd}$ Edition, p. 864,865,872,873.*

Dugan, "ActiveX Technology, You can't go there today", 1997, http:/ww1.infoworld.com/cgi-bin/displayTC.pl?/970519analysis.htm, p. 1–15.*

"Microsoft Announces Innovative Security Zones" Jun. 3, 1997, wysiwyg://19/http://www.microsoft.com/presspass/press/1997/Jun97/securipr.asp, p. 1–3.*

"Signing with Microsoft Authenticode Technology" 1996, http://support.modempool.com/support/Sweep/sweep075.htm, p. 1–16.*

Fryer et al, "MIcrosoft Press Computer Dictionary" 1997, Microsoft Press, p. 16.*

"McAfee.com Clinic, Your Online Anti-Virus & PC Maintenance Solution User Guide" May 2001, p. 1–50.*

"McAfee Office User Guide" Aug. 2001, Version 3.1, p. 150–151.* http://www.mcafee.com, Home—The Place for Your PC, one page, Aug. 9, 1999.

http://www.mcafee.com, Clinic—McAfee Clinic, one page, Aug. 9, 1999.

http://www.mcafee.com, Clinic—Coming Soon, one page, Aug. 9, 1999.

http://www.mcafee.com, Clinic—Optimize Performance, one page, Aug. 9, 1999.

http://www.mcafee.com, Clinic—Clean Hard Drive, one page, Aug. 9, 1999.

http://www.mcafee.com, Clinic—Software Update Finder, one page, Aug. 9, 1999.

http://www.mcafee.com, Clinic—Fees for McAfee Clinic Premium Services, two pages, Aug. 9, 1999.

http://msdn.microsoft.com, COM Techniques by Panther Software, Introduction, two pages, Oct. 7, 1998.

http://msdn.microsoft.com, The ABCs of MFC ActiveX Controls, 31 pages, Oct. 22, 1996.

http://msdn.microsoft.com, Web Workshop—Signing and Marking ActiveX Controls, 9 pages, Oct. 15, 1996.

http://msdn.microsoft.com, Web Workshop—ActiveX Controls Overview, two pages, Oct. 23, 1998.

http://www.microsoft.com, About Microsoft COM, two pages, Feb. 25, 1999.

http://www.microsoft.com, Component Object Model (COM), two pages, Mar. 30, 1999.

http://msdn.microsoft.com, The Component Object Model: A Technical Overview, 19 pages, Oct., 1994.

http://www.msdn.microsoft.com, The COM Programmer's Cookbook, 67pages, Sep. 13, 1995.

http://msdn.microsoft.com, Events vs. Callbacks, two pages, Apr., 1997.

http://msdn.microsoft.com, Developing Applications with OLE 2.0, 20 pages, Sep. 13, 1994.

http://msdn.microsoft.com, What OLE is Really About, 45 pages, Jul., 1996.

http://msdn.microsoft.com, OLE for Idiots: A is for Attitude, 7 pages, Jun. 22, 1993.

http://msdn.microsoft.com, OLE for Idiots: B is for Beginning, 8 pages, Jun. 22, 1993.

http://msdn.microsoft.com, OLE for Idiots: C is for Container, 33 pages, Aug. 6, 1993.

http://msdn.microsoft.com, OLE for Idiots: D is for Dragon, 12 pages, Sep. 20, 1993.

http://msdn.microsoft.com, OLE Property Sets Exposed, 26 pages, Oct. 6, 1995.

http://msdn.microsoft.com, OLE Integration Technologies: A Technical Overview, 20 pages, Oct., 1994.

http://msdn.microsoft.com, Notes on Implementing an OLE Control Container, 66 pages, Sep. 21, 1994.

* cited by examiner

METHOD AND APPARATUS FOR SECURING SOFTWARE DISTRIBUTED OVER A NETWORK

RELATED APPLICATION

The present application claims the benefit of priority from and is a continuation-in-part of the commonly-owned application Ser. No. 09/208,735, filed Dec. 8, 1998, now issued as U.S. Pat. No.: 6,266,774.

FIELD OF THE INVENTION

This invention relates in general to computer networks. In particular, the invention relates to secure ways of distributing software by server computers to client computers over a computer network.

BACKGROUND OF THE INVENTION

The public data networks, collectively called the Internet and colloquially referred to as the Web, are becoming increasingly popular. Among other things, the Internet provides a communication medium to distribute software products to computers that are located at distant places. The numerous methods by which sellers of computer software programs deliver executable programs automatically to client computers owned or operated by users are described in the parent application, the disclosure of which is hereby incorporated by reference.

To understand the invention, it is helpful to understand the distinctions among the terms content, browser, type-setting program, embedded object and script. These five types of entities are described below in the context of Internet-related software.

Content is the subject matter contained in a web page. Content is distinguished from the other entities described herein in that content is not a program; it is the data that is presented to a user.

A web browser, or simply, a browser, is a computer program that provides access to the vast resources of the Internet. Typically, this is done by providing a "window" to the data located on other computers connected to the Internet. A frame is a part or section of a browser window that contains a distinct display area. If a web page is defined to contain multiple frames, each frame can act as an independent display area, and can download web pages located at different web sites, while displaying them together in one window on a browser. Alternatively, a web page may cause multiple browser windows to be created on the user's computer. A browser can also be described as a "container" of the various components it displays. Thus, while the components are embedded in a browser, the browser envelops the components.

In general, in a window-based computer system, such as the Windows™ 98™ program marketed by the Microsoft Corporation, windows are arranged hierarchically. A browser program that executes on a window-based computer system is also arranged hierarchically. When a browser application is launched on a windows-based computer system, the first window that appears is called "parent window" or "main window" or "top-level" window. This top-level window can later "spawn" or "fork" other windows, which are called "sub-windows" that run other applications. A sub-window may be created by executing a script within a browser window, and may be programmed to run another instance of a browser program. In such cases, the sub-window is called an "opener" window. Thus, it may be the case that a first window running a browser program—a top-level window—is programmed to point to a web site, and a sub-window created from the same browser program is programmed to point to a different web site.

A type-setting program is a presentation program, typically written in the Hyper Text Markup Language (HTML). In an HTML-encoded program, content is surrounded by codes that indicate the manner in which the browser presents the content to a user. Additionally, HTML encodes certain devices called "links" that allow a user to "navigate" the web by simply clicking on a sensitive area of the web page.

A document that contains "objects" or "components" like graphics, audio or video files, or charts in addition to text is called an embedded document object. Several competing standards exist in the marketplace for documents that can be transmitted over the Internet and displayed in a browser. For example, two such standards are OpenDoc, promoted by the International Business Machines Corporation and Object Linking and Embedding (OLE), promoted by the Microsoft Corporation. Typically, these standards provide for an application programming interface (API) that allows an independent software vendor (ISV) to develop applications that deliver components via the Internet. An API generally allows a programmer to interact with an enveloping browser. For example, a programmer may seek to determine the precise configuration of the browser by reading the values of its internal parameters. Alternatively, a programmer may wish to adapt the browser to a desired configuration by appropriately setting the browser's parameters.

Finally, a script is a list of computer-executable instructions, typically written in a human-readable language. Some browsers are configured to execute instructions written in script languages. In such browsers, an analog of a Central Processor Unit (CPU) which is an essential component of all modern computers-is defined within the software contained in the browser. This software-defined CPU executes the scripts within the browser environment. For example, JavaScript™ is a language in which a programmer can code in a human-readable set of instructions that can be executed within the browser environment. In this case, the browser is said to be a "container" object to execute the script within its bounds.

Referring now to the parent application, to achieve the objective stated therein, a web browser program running on a client computer must be able to access the inner workings of the client computer. This can be achieved with the help of the OLE document object technology. The OLE technology is a "system-level object architecture that includes services for all-inclusive data access, remote distribution of software components across heterogeneous platforms, robust transaction processing, and large group development." & "OLE is?", undated, (visited Dec. 12, 1998), <www.microsoft.com/oledev/olemkt/oleent/oleent.btm>. Active X™ technology, developed by the Microsoft Corporation, of Redmond, Wash., uses the OLE architecture and provides the building blocks that enable a provider to distribute over a network software executables that can be executed on a client machine. In general, such distribution of software executables is done via a web browser as described in the parent application. Typically, this execution on a client machine is done when a page source is input to it by invoking certain scripts embedded in the web browser. The downloaded software components are called ActiveX™ controls, which are computer executable pieces of program code. One feature of ActiveX™ controls is hat they have no restrictions placed on them once they reach a user's machine. For example, a programmer may write an ActiveX™ control tat, upon downloading to a user's computer, can shut down the computer or reformat its hard drive thereby destroying all data stored on the computer. This creates an easy way for malicious programs such as viruses to reach the client computer and be executed without the user's notice.

To overcome these security problems, the Microsoft Corporation requires all ActiveX™ controls to be verified by a signature initiative called Authenticode. This verification works in the following way. Each ActiveX™ control is given a secure and encrypted digital signature by a trusted corporation. All browsers that allow download and execution of ActiveX controls are pre-programmed to verify the digital signature. Every time an ActiveX™ control is about to be downloaded, the browser examines the digital signature associated with the control. If the signature is verified as authentic by the browser, it is downloaded without any problems. Otherwise, the browser issues a warning message to the user.

As explained in the parent application, the invention described therein uses some of the features of a programming methodology exemplified by ActiveX™ to effect easy and "hands-free" automatic downloading of software executables to a user's computer without any action taken on the part of the user. While the invented method and system help achieve the stated ends, a security threat may be created because of the above-mentioned feature of the ActiveX-like technologies that allows unrestricted access by the embedded code to a user's computer.

Because computers today are interconnected by networks such as the Internet, computer security has become a more important issue than before. Today, computers are more prone to attacks by viruses and Trojan Horses. A virus is a piece of computer code that replicates itself without a user's intervention. Left unchecked, a virus may copy itself stealthily to other computers and corrupt the data stored in storage devices connected to the computers. For example, a virus may rewrite a section of a computer start-up program called the "boot sector". Every time a computer is started, the virus copies itself into the memory of the computer and waits. Suppose a user wishes to copy some data from the computer to a portable medium such as a floppy disk. The virus that has copied itself to the memory could be programmed to intercept the writing of the data to the disk and copy itself to the disk along with the data. In this manner, the virus has replicated itself to the floppy disk and is now ready to infect other computers where the floppy disk is used.

In contrast to a computer virus, a "Trojan Horse" is a malicious computer program that—like the fabled instrument of war used by ancient Greeks to gain entry into Troy—causes a user to believe that it is a legitimate program and entices the user operating a computer to perform certain actions that lead to compromising the security of the data stored in the computer.

Referring back to the parent application, assume that in accordance with the invention described therein, an Internet Clinical Services Provider (ICSP) downloads a software program called QuickClean™, designed to "cleanup" the user's hard drive. In accordance with the above-mentioned ActiveX™ Authenticode initiative, a license file is delivered to the user along with the QuickClean program. This software is designed with embedded methods or sub-routines that, when invoked properly using a script, rid the user computer of unwanted or unused software in an orderly manner. However, since these methods or sub-routines for removing unwanted or unused software are invoked by a script, a malicious user can also invoke the script in such a way as to remove desirable or valuable software, thereby causing severe damage to the user's computer. Moreover, a malicious user may also attempt to secretly transfer the contents of a user's computer by e-mailing these to his own computer. In the computer security lingo, such a malicious user or programmer is called a computer "hacker." The above-mentioned malicious act, called computer "hacking," can be accomplished in two ways.

In accordance with a first way of hacking, a hacker obtains a legitimate copy of QuickClean™ and its associated license file from the ICSP. The hacker can then create his own web site and host both QuickClean™ and the associated Authenticode license file on his web site and invite others to use the "free" software. The hacker creates a web page on his web site that contains a malicious script that will use the methods or sub-routines in the QuickClean™ program to erase a user's hard disk. When a user, enticed by the "free" software downloads the web page from the hacker's web site, the hacker will download the QuickClean™ program to the user's computer and invoke the methods in the program to erase the user's hard disk. Alternatively, suppose a user visits an authorized ICSP web site first and downloads the QuickClean™ program along with the associated Authenticode license file. Later, the user visits the hacker's web site. Since the QuickClean™ program is already stored on the user's computer, the hacker does not need to obtain a legitimate copy to wreak havoc on a user's computer by providing a script to invoke the sub-routines embedded in the QuickClean™ program.

In accordance with a second way of hacking, a hacker may entice an unsuspecting user to visit his web site. The hacker may program his web pages to invoke multiple frames or multiple browser windows. In one frame or browser window, the hacker can cause the user computer to download the QuickClean™ program and the associated license file from the ICSP web site. In a second frame or browser window, the hacker can run his malicious script, thereby causing damage as described above.

There is a need, therefore, for a system and method to prevent a hacker from activating the methods or sub-routines embedded in a computer executable code downloaded to a user computer via the web.

SUMMARY OF THE INVENTION

The present invention is a method to verify a downloaded software object so that the software object is executed only if it is downloaded by an authorized entity. Accordingly, the invention comprises a software program that is downloaded to a client computer by a server computer and is programmed to execute on the client computer only if it is enabled to do so. In a preferred embodiment of the invention, a computer-executable program code first determines the URL to which a browser running on the client computer is pointed and enables the downloaded software program only if the URL to which the browser is pointed is an authorized URL.

In another aspect of the invention, the determination of the URL to which the browser is pointed is made by verifying the URL pertaining to the "top-level" window of the browser. In a yet another aspect, the determination is made by verifying the URL pertaining to the "opener" window of the browser.

DESCRIPTION OF THE DRAWINGS

These and other objects, features and advantages of the invention will be more readily apparent from the following detailed description of a preferred embodiment in which.

DETAILED DESCRIPTION OF THE PREFERRED EMBODIMENTS

Figure 1:
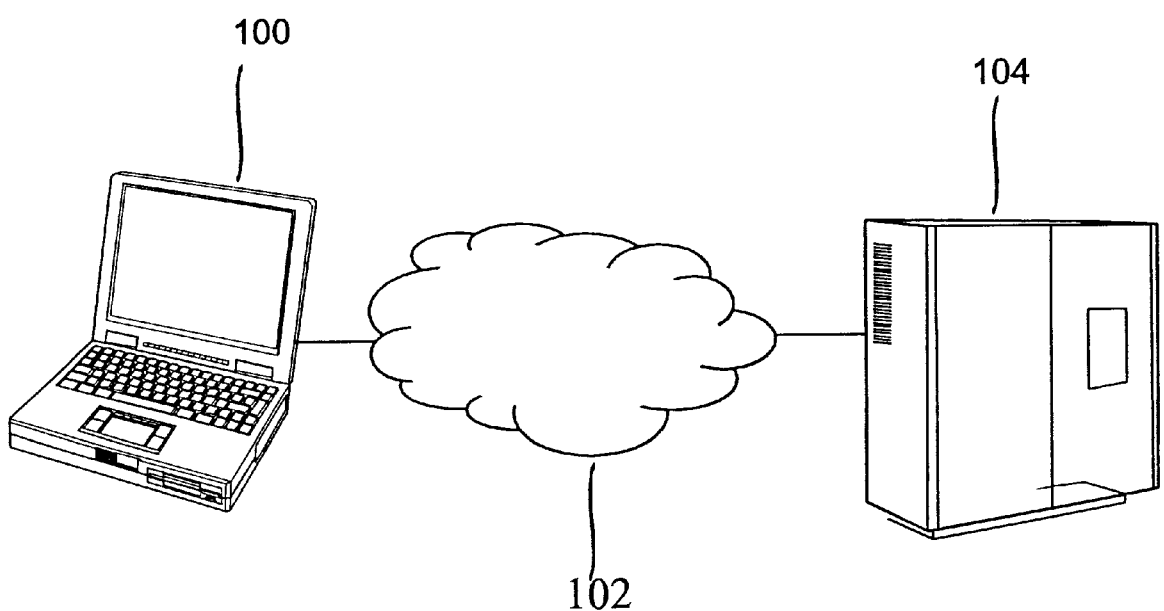
FIG. 1 shows a server computer connected to a client computer via the Internet.

Referring to FIG. 1, a client computer 100 is connected to the Internet 102. Also connected to the Internet 102 is a server computer 104. The client computer 100 can be a personal computer (PC), and is equipped with a processor, such as a Pentium II™ microprocessor, a display device such as a computer monitor or a flat panel display, a memory such as a semiconductor memory, an input device such as a computer keyboard or a mouse, and a storage device such as a computer hard drive. The client computer 100 is configured to run an ActiveX™-compatible browser such as the Microsoft® Internet Explorer browser program. The browser program is adapted to incorporate an embedded object model, facilitating the delivery of objects by the server computer 104 to the client computer 100. Though in the preferred embodiment a Microsoft® Internet Explorer browser and the ActiveX™ technology are discussed, these should not be viewed as limitations to the invention. While in the illustrative discussion herein the technologies are enumerated as the best ways to practice the invention, the invention is contemplated to extend beyond these specific modes of implementation.

As described in the parent application, the server computer 104 is operated by an Internet Clinical Services Provider (ICSP). The server computer 104 comprises a processor, such as a Pentium II™ microprocessor, a memory such as a semiconductor memory, and a storage device such as a computer hard drive. The server computer 104 is configured to receive request messages from the client computer 100 over the internet in the Hyper Text Transfer Protocol (HTTP), File Transfer Protocol (FTP) or any similar protocol used to transfer data, video, voice or a combination of these media. The server computer 104 is configured to transmit in response messages that include "web pages" that are programmed in Hyper Text Markup Language (HTML) or a similar language. Embedded in the web pages are components such as documents, scripts, objects, frames and others that enable the server computer 104 to display colorful graphical images on the display device coupled to the client computer 100.

Figure 2A:
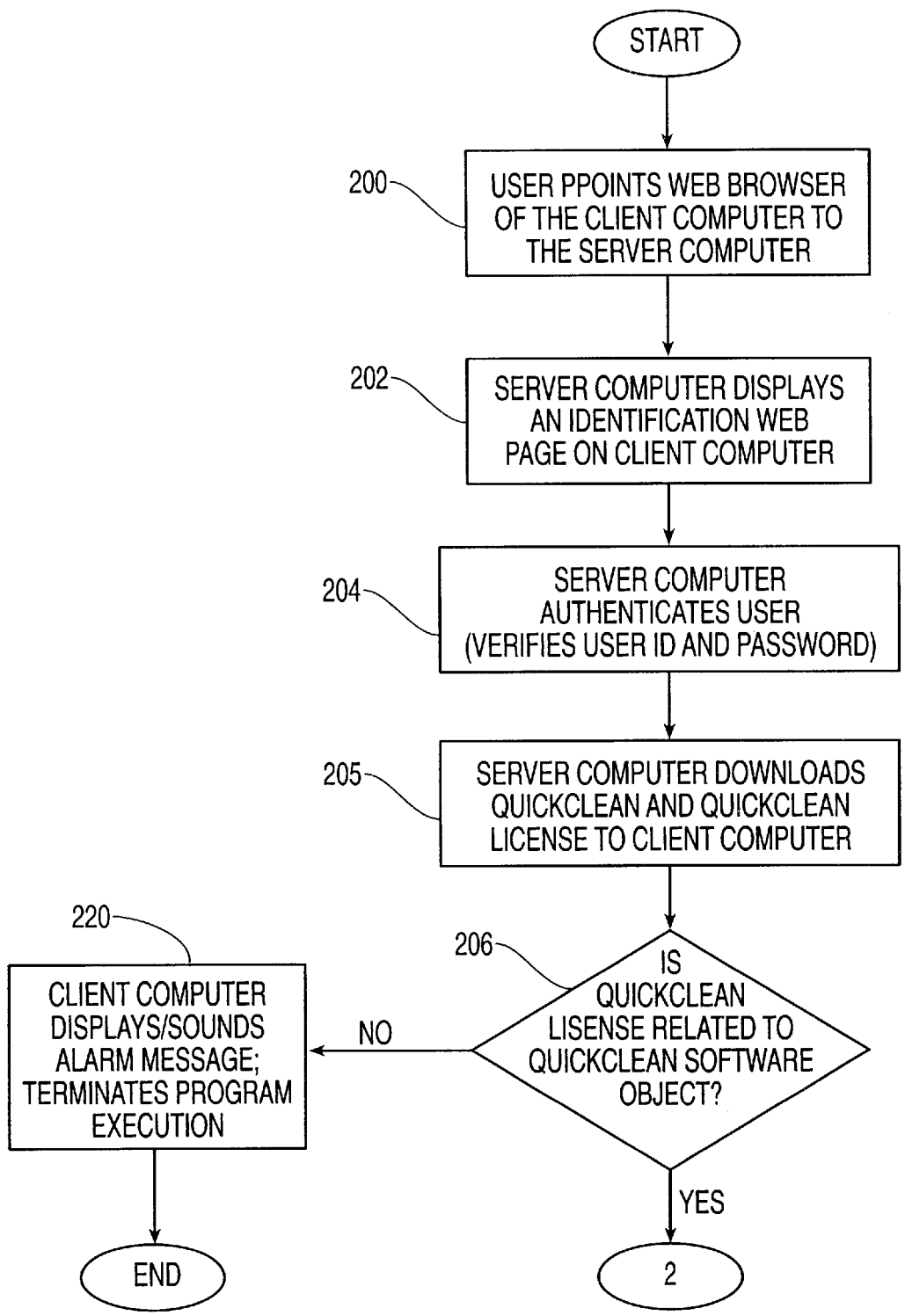
FIGS. 2A & 2B is a flow diagram depicting the steps comprising a preferred method to practice the invention.
Figure 2B:
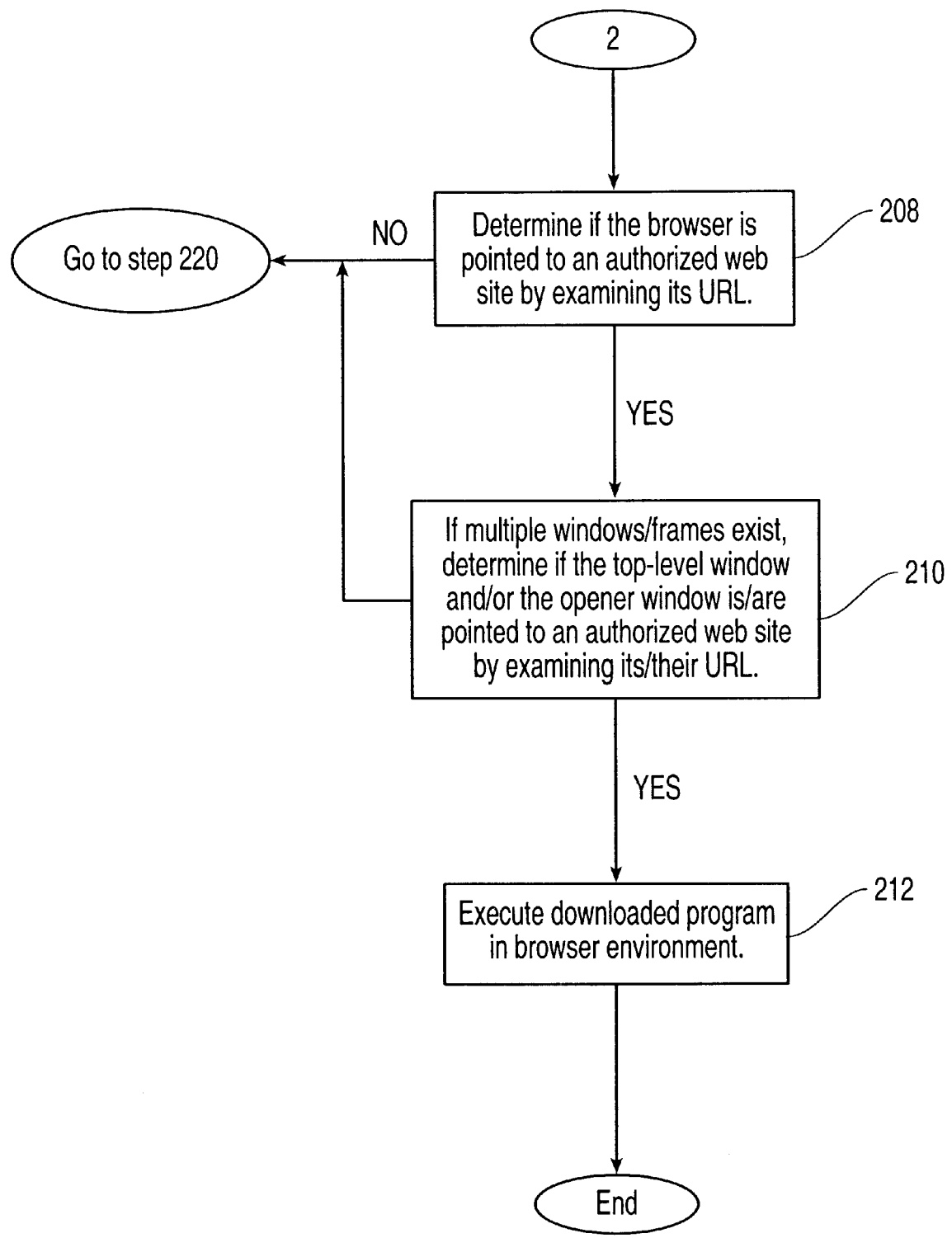

Now referring to FIGS. 2A and 2B, in accordance with the invention described in the parent application, a user operating the client computer 100 enters the Universal Resource Locator (URL) pertaining to the server computer 104 in a window provided by the browser program running on the client computer 100. When the user presses a "send" button on the browser, this causes a request message to be transmitted to the server computer 104. (Step 200). The server computer 104 then causes an identification web page to be displayed on the browser window at the client computer 100. After the user enters the appropriate identification information in the browser window, this information is transmitted to the server computer. (Step 202).

The server computer 104 authenticates the user (Step 204), and if authenticated, proceeds to download a copy of an ActiveX™-control-like software program and an associated license file to the client computer 100. (Step 205). For the purposes of illustration, assume that the software program is QuickClean™ and the license file is named QuickCleanLicense. The license file works in conjunction with the software program in the following way. When software objects embedded in the software program are to be executed, the browser or another program running on the client computer 100 verifies if the license file and the software objects are "related." If they are found to be related, the methods (or sub-routines) within the software objects can be "invoked" by a script running on the client computer 100. (Step 206). If, on the other hand, QuickCleanLicense is found to be not related to QuickClean software, then the client computer 100 terminates the program after displaying or sounding an alarm message. (Step 220). It should be noted that authentication of the user by the server computer 104 (described in step 204) and the verification of the software objects by the client computer 100 (described in step 206) are different tasks and should not be confused with each other.

The invented method adds an additional step to the art described in the parent application. After the client computer 100 determines that the QuickClean™ software and the QuickCleanLicense are "related," the code in the QuickClean™ software must be "enabled" before it can be put to intended use. This is done by appropriately programming the QuickClean™ software to perform a "first-check" and a "second-check" as follows.

In order to prevent the first method of hacking described in this application, the QuickClean™ software is programmed to perform a "first-check" whereby it is determined if the browser is pointed to an ICSP-authorized web site when the software is invoked by the script running on the client computer. When the script invokes a sub-routine or a method in the QuickClean™ software, a first set of instructions embedded in the QuickClean™ software queries the browser to determine the URL to which the browser is pointed. (Step 208).

A hacker may mislead the client computer 100 when it performs the above-mentioned "first-check." He can do this by causing the client computer to open a new browser window or a new browser window frame, according to the second method of hacking described above. To prevent this, the following method is used to perform a "second-check" of the QuickClean™ software. This is accomplished by a second set of instructions embedded in the QuickClean software. The second set of instructions queries the browser to determine the URL pointed to by the "top-level" window and the "opener" window. (Step 210).

For example, if ActiveX™ objects embedded in an OLE-compatible browser are used to implement the QuickClean™ program, the URL to which the browser is pointed can be obtained by calling the method GetDisplayName provided in the Monicker Interface or by calling the GetLocation method provided in the Service Provider Interface of the IOleClientSite object defined within the ActiveX™ object. If both the methods (or subroutine calls) return the same result, which is a ICSP-authorized URL, then the QuickClean™ software is deemed to have passed the "first check." (Step 208). These two methods can be illustrated as follows:

(1) IOleClientSite→MonickerInterface→GetDisplayName()
(2) IOleClientSite→ServiceProviderInterface→BrowserAppInterface→GetLocation()

Additionally, the ActiveX objects embedded in the OLE-compatible browser can determine the URL pointed to by the "top-level" window of the browser by calling the BrowserApp Interface which can query the Document Object to obtain the HREF property of the Top Window Object. The "opener" window is determined in a similar manner. This can be illustrated in the following sequence of function calls:

(1) BrowserAppInterface→DocumentObject→WindowObject→TopWindowObject→LocationInterface→Href Property()=top-level URL
(2) BrowserAppInterface→DocumentObject→WindowObject→TopWindowObject→OpenerWindowObject→LocationInterface→Href Property=opener URL Once it is determined that the "top-level" URL and the "opener" URL point to the same authorized URL, then the QuickClean™ software is deemed "secondarily enabled." (Step 210).

Upon a successful enablement according to steps 208 and 210, the QuickClean™ software is executed by scripts running on the client computer 100. (Step 212). If, on the other hand, the QuickClean™ software is not enabled according to steps 208 or 210, then an attempt by a script to run the software results in error messages. (Step 220).

There is described in the foregoing a new and useful invention to prevent a hacker from causing a threat to the information contained in a client computer by misusing authenticated objects designed to perform secure tasks. One skilled in the art may make several modifications to or departures from the preferred embodiments provided herein without departing from the spirit and scope of the invention, or without undue experimentation. For example, the order in which steps 208 and 210 are executed may be interchanged; other browser programs can be used to practice the invention; and the technologies described herein to deliver and execute software via a computer network may be replaced with other similar technologies. All such departures and modifications are within the scope of this invention and should be construed accordingly.

What is claimed is:

1. A method to secure software downloaded from a server computer to a client computer over a computer network, the method comprising:

receiving a Universal Resource Locator (URL) pertaining to a server computer in a browser window provided by a browser program running on a client computer;

initiating the downloading of a web page on the browser window on the client computer based on the URL, wherein the web page has associated therewith a control software program with a corresponding digital signature;

verifying the control software program using the digital signature;

displaying a first message if the control software program fails the verification;

querying the browser program to determine the URL to which the browser program is pointed;

determining whether the URL to which the browser program is pointed is authorized;

executing the control software program if it is determined that the URL to which the browser program is pointed is authorized; and displaying a second message if it is determined that the URL to which the browser program is pointed is not authorized.

2. The method of claim 1 and further comprising authenticating a user via the browser program.

3. The method of claim 1 and further comprising invoking at least two of a plurality of methods provided by the browser program to determine if it is pointed to an authorized web site; and comparing the results obtained by the methods that are invoked.

4. The method of claim 1 and further comprising invoking at least one method provided by the browser program to obtain information located in a top-level browser window.

5. The method of claim 1 and further comprising invoking at least one method provided by the browser program to obtain information located in an opener browser window.

6. Computer executable program code stored on a computer readable medium to implement the method of claim 1.

7. A method to secure software downloaded from a server computer to a client computer over a computer network, the method comprising:

receiving a Universal Resource Locator (URL) pertaining to a server computer in a browser window provided by a browser program running on a client computer;

initiating the downloading of a web page on the browser window on the client computer based on the URL, wherein the web page has associated therewith a control software program with a corresponding digital signature, wherein the control software program includes computer maintenance software;

verifying the control software program using the digital signature;

displaying a first message if the control software program fails the verification;

querying the browser program to determine the URL to which the browser program is pointed;

determining whether the URL to which the browser program is pointed is authorized;

executing the control software program if it is determined that the URL to which the browser program is pointed is authorized; and displaying a second message if it is determined that the URL to which the browser program is pointed is not authorized.

8. A method to secure software downloaded from a server computer to a client computer over a computer network, the method comprising:

receiving a Universal Resource Locator (URL) pertaining to a server computer in a browser window provided by a browser program on a client computer;

initiating the downloading of a web page on the browser window on the client computer based on the URL, wherein the web page has associated therewith a control software program with a corresponding digital signature;

verifying the control software program using the digital signature;

displaying a first message if the control software program fails the verification;

querying the browser program to determine the URL to which the browser program is pointed;

determining whether the URL to which the browser program is pointed is authorized;

executing the control software program if it is determined that the URL to which the browser program is pointed is authorized;

displaying a second message if it is determined that the URL to which the browser program is pointed is not authorized;

determining a first URL pointed to by a top-level window;

determining a second URL pointed to by an opener window; and executing the control software program only if both the first URL and the second URL are authorized.

* * * * *

UNITED STATES PATENT AND TRADEMARK OFFICE
CERTIFICATE OF CORRECTION

PATENT NO.       : 6,499,109 B1                                  Page 1 of 1
APPLICATION NO.  : 09/248115
DATED            : December 24, 2002
INVENTOR(S)      : Balasubramaniam et al.

It is certified that error appears in the above-identified patent and that said Letters Patent is hereby corrected as shown below:

Col. 2, line 34 change "(CPU)which" to --(CPU) which--;
Col. 2, line 51 change "&" to --See--;
Col. 2, line 53 change "/oleent.btm" to --/oleent.htm--;
Col. 2, line 65 change "is hat" to --is that--;
Col. 3, line 1 change "control tat" to --control that--;
Col. 8, line 34 following "program" insert --running--.

Signed and Sealed this

Thirtieth Day of November, 2010

David J. Kappos
*Director of the United States Patent and Trademark Office*